UNITED STATES PATENT OFFICE 2,414,647

TREATMENT OF WELL DRILLING FLUIDS

Raymond W. Hoeppel, Arcadia, Calif., assignor to National Lead Company, Los Angeles, Calif., a corporation of New Jersey No Drawing. Application April 7, 1943,
Serial No. 482,211

4 Claims. (Cl. 252—8.5)

This invention relates to aqueous mud-laden or drilling fluids, such as are employed in the drilling of oil and gas wells as by the rotary system. More particularly, this invention relates to the treatment of such fluids to control their viscosity and thixotropic properties by chemical compounds and which constitute an improvement of the means described in the Wayne patent, No. 2,294,877, of September 1, 1942.

The Wayne patent describes the employment of polyphosphoric acid compounds having, specifically stated, an alkali metal base, so as to be more readily soluble in the drilling fluid. Applicant has, however, discovered that the efficiency and the effectiveness of polyphosphoric acid compounds may be increased if the solubility of the polyphosphate is a retarded one.

One of the objects of this invention, therefore, is to provide for a treatment of a well drilling fluid, whereby the action of the treating agent is retarded.

Another object is to provide a drilling fluid and a process of treatment of the same whereby the viscosity, gel strength and thixotropic properties are altered or controlled.

Further objects will appear from the detailed description in which will be set forth a number of embodiments; it will be understood, however, that this invention is susceptible of various embodiments within the scope of the appended claims.

Generally stated, and in accordance with an illustrative embodiment of this invention, the polyphosphoric acid compound is one which is retardedly soluble in the aqueous drilling fluids, which has a non-alkaline base, but which base is replaceable by an alkali metal in the drilling fluid or added thereto, and which therefore act by double decomposition with the alkali in the drilling fluid. The polyphosphoric acid compound is an undissolved, insoluble polyphosphate of a heavy metal of a class consisting of copper, nickel, iron and titanium, representing a metathetical compound of such a metal with a polyphosphate radical, and having the property of reacting with an alkaline drilling fluid to form at least one soluble reaction product. These polyphosphates are actually truly insoluble in water or drilling fluids, in the sense that they do not dissolve as such regardless of how long a time is given for solution, but on the contrary only appear to enter into solution because their hydrolysis products are soluble. Examples of such polyphosphates are those of the heavy metals, viz: copper, iron, nickel and titanium; particularly useful are the pyrophosphates, such as $Cu_2P_2O_7$, $Fe_4(P_2O_7)_3$, $Ni_2P_2O_7$ and $Ti_2P_2O_7$. All of these are sufficiently soluble in a well drilling fluid to react with the alkalies present therein, such as the hydrates of sodium, potassium, etc.; thus the action, when using copper pyrophosphate, is probably as follows:

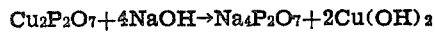
$$Cu_2P_2O_7 + 4NaOH \rightarrow Na_4P_2O_7 + 2Cu(OH)_2$$

The action, therefore, appears to be one of conversion of the retardedly soluble heavy metal phosphate into the alkali metal pyrophosphate, with the formation of a heavy metal hydroxide in the drilling fluid, so that the alkali metal polyphosphate apparently secures the desired control as it does with the polyphosphates described in the Wayne patent. However, the action is retarded and hence there is less chance of over treating of the drilling fluid upon introduction of the compound. This is a distinct advantage, because the conversion is a gradual one and sufficient of the polyphosphate may be added for an extended treatment during an extended course of drilling. The heavy metal polyphosphate has a better thinning action and produces more favorable gel strength while retaining the low water losses; and all of this at elevated temperatures. The latter is a distinct advantage because drilling fluids are subjected to elevated temperatures, particularly in the drilling of deep wells.

The heavy metal pyrophosphates also have the advantage of being readily employed in drilling fluids of the higher ranges of pH; indeed these polyphosphates operate more effectively at a pH range in excess of 7.5, and are particularly effective above a pH range of 9. That is an advantage not only because many drilling fluids are alkaline, but many such fluids are more effectively operated at higher pH ranges. Because of the replacement of the heavy metal base by the alkaline base in the drilling fluid, the pH will, of course, be reduced in accordance with the amount of polyphosphate added. But this is a distinct advantage where it is desired to reduce or control the pH of a drilling fluid.

In accordance with this invention, the drilling fluid may have incorporated therewith a small percentage of the heavy metal polyphosphate, either alone or with a suitable lyophile colloid or a suitable buffer or both. Examples of suitable lyophile colloids are quebracho extract and chestnut extract and an example of a suitable buffer is sodium bicarbonate.

In the actual treatment of a drilling fluid, as distinguished from laboratory tests, the procedure is not one of using a given proportion or percentage of the treating agent with reference to the drilling fluid; the treatment is one of adjusting the viscosity and gel strength by the addition of the treating agent. This will be apparent when we consider the fact that during the course of drilling a formation, which may contain many salts, cement or cuttings generally, the viscosity will be affected by the addition of these formation ingredients. The water used in the making of a drilling fluid, the temperature at the bottom of the well (which, as previously stated, may be an elevated one) and other conditions also affect the viscosity of the drilling fluid. The practical procedure, therefore, is to add the treating agent in accordance with requirements in order to secure the desired viscosity and gel strength and, in general, the desired reduction in viscosity of a drilling fluid which has become contaminated by the ingredients of the formation; or to add sufficient of the treating agent in order to inhibit a probable contamination effect.

In order to illustrate the effect of the treating agent embodying this invention, the following tests and results will be given:

I

A Mojave mud known as P-34 and of a character so that a fluid of 18 centipoises viscosity contains 40% solids was "salt cut" with 0.2% sodium chloride, and then treated with various treating agents. The results were as follows:

| No. | Thinner, lb./bbl. | Added type | NaOH added, lb./bbl. | Visc. after— | | pH after— | | After 18 hours at 160° F. | | | | |
|---|---|---|---|---|---|---|---|---|---|---|---|---|
| | | | | 4' cpe. | 30' cpe. | 4' | 30' | Visc., cpe. | pH | Ini. gel, g. | Fin. gel, g. | 30' water loss ml. |
| (1) | 0 | Blank | 0 | 58.0 | | 9.32 | | 86.0 | 9.32 | | | 10.8 |
| (2) | .10 | Na₄P₂O₇ | 0 | 22.5 | | | | | | | | |
| (3) | .20 | do | 0 | 13.4 | | 9.42 | | 49.0 | 9.42 | | | |
| (4) | .40 | do | 0 | 12.8 | | 9.48 | | 29.0 | 9.62 | 10 | 120 | 9.2 |
| (5) | .29 | Cu₂P₂O₇ | 0 | 24.0 | 21.0 | 9.12 | 9.08 | 54.0 | 9.12 | | | |
| (6) | .59 | do | 0 | 14.7 | 11.0 | 8.82 | 8.72 | 27.0 | 8.98 | 14 | 90 | 9.4 |
| (7) | .31 | Fe₄(P₂O₇)₃ | 0 | 47.0 | 45.0 | 9.00 | 8.88 | 46.0 | | | | |
| (8) | .62 | do | 0 | 46.0 | 42.0 | 8.78 | 8.60 | 44.0 | 8.92 | 75 | 150 | 9.6 |
| (9) | .62 | do | .06 | 33.5 | | 9.22 | | | | | | |
| (10) | .62 | do | .11 | 26.0 | 21.0 | 9.62 | 9.42 | | | | | |

In the above the viscosities were in centipoises (cpe.); the viscosity readings were taken after the minutes indicated (viz. 4'); the pH was taken with the Beckman pH meter; the gel strength was in grams (g.), and the water loss was in milliliters (ml.).

Comparing first the copper polyphosphate with the sodium pyrophosphate, the following will be seen particularly from a comparison of tests (4) and (6). The viscosities are about on a par; the pH has, however, been materially lowered; this is true not only before but even after heating. After heating, the water losses are again about the same, with, however, the final gel strength of (6) materially smaller than as for (4) and within a better operating range. Comparing test (8) for the iron pyrophosphate with (6) for the copper pyrophosphate and (4) for the sodium pyrophosphate, it will be seen that while the viscosity is higher, it can be reduced by the further addition of sodium hydroxide. The pH of (8) is, however, comparable to that of (6) and materially lower than that of (4). The water losses of the three are about the same, although the final gel strength of (8) is higher than that of (6) and (4).

II

A McKittrick mud of a character so that a fluid of 18 centipoises contains 16% solids was salt cut with 0.07% sodium chloride and then treated with sodium and copper pyrophosphates with the following results:

| No. | Thinner, lb./bbl. | Added type | Initial | | | After 4 days at 160° F. and 21 days at 80° F. | | | | |
|---|---|---|---|---|---|---|---|---|---|---|
| | | | Visc., cpe. | pH | 30' water loss, ml. | Visc., cpe. | pH | Ini. gel, g. | Fin. gel, g. | 30' water loss, ml. |
| (1) | 0 | Blank | 62 | 9.25 | 15.2 | | | | | |
| (2) | .07 | Na₄P₂O₇ | | | | | | | | |
| (3) | .14 | do | 4.7 | 9.38 | 12.9 | | | | | |
| (4) | .84 | do | 3.2 | 9.15 | | 8.3 | 9.65 | 1 | 55 | 14.4 |
| (5) | .11 | Cu₂P₂O₇ | 17.8 | 9.12 | | | | | | |
| (6) | .22 | do | 5.4 | 9.00 | 13.0 | | | | | |
| (7) | 1.34 | do | 3.6 | 8.29 | | 8.9 | 8.72 | 1 | 42 | 13.3 |

In tests (3) and (6) and (4) and (7) respectively, the quantities are approximately equivalents, because the sodium salt was anhydrous, while the copper salt contained 24% moisture. It will again be seen that the action of the copper salt is an improved one, for in addition to a reduction in pH and gel strength, there is a reduction in water loss for the copper salt.

It will thus be seen that the copper salt is more effective than the iron salt and, of course, more effective than the sodium salt. In these tests both the copper and iron salts were prepared by adding tetrasodium pyrophosphate dissolved in cold (70° F.) water to a cold water solution of an equivalent quantity of cupric acetate or ferric chloride. The precipitates were filtered through a Buchner funnel, washed several times with large portions of cold water (70° F.), and air dried at room temperature or to 160° F. It was found that if the metallic pyrophosphates are dried at 105° C. that most of the pyrophosphate is converted over to the ortho form. Even on heating the air dried sample to 105° C. a considerable amount is formed of the orthophosphate.

Other heavy metal polyphosphates may be employed, including the tri and tetraphosphates of the heavy metals, and including also various metaphosphates of the heavy metals, such as copper metaphosphate, iron metaphosphate, nickel metaphosphate and titanium metaphosphate. All of these are retardedly soluble and in an alkaline drilling fluid will result in the formation of free polyphosphate ions.

It will be seen that the invention accomplishes its objects. A viscosity and gel strength controlling agent is provided, which has a retarded solubility when added to the drilling fluid with the advantages pointed out. It also has a better thinning action than has the sodium salt, even at elevated temperatures, and results in the production of more favorable gel strengths while the water losses are maintained low.

Having thus described the invention, what is claimed is:

1. An aqueous mud-laden well drilling fluid containing a small percentage of an undissolved, insoluble polyphosphate of a heavy metal of a class consisting of copper, nickel, iron and titanium, representing a metathetical compound of such a metal with a polyphosphate radical, and having the property of reacting with an alkaline drilling fluid to form at least one soluble reaction product.

2. An aqueous mud-laden well-drilling fluid containing a small percentage of an undissolved retardedly soluble heavy metal pyrophosphate.

3. In the art of drilling wells by the employment of an aqueous mud-laden well-drilling fluid, the process comprising, adding to such a drilling fluid in an amount sufficient to control the viscosity and thixotropic properties thereof, of an undissolved, insoluble polyphosphate of a heavy metal of a class consisting of copper, nickel, iron and titanium, representing a metathetical compound of such a metal with a polyphosphate radical, and having the property of reacting with an alkaline drilling fluid to form at least one soluble reaction product.

4. In the art of drilling wells by the employment of an aqueous mud-laden well-drilling fluid, the process comprising, adding to such a drilling fluid a small percentage of an undissolved retardedly soluble heavy metal pyrophosphate, and circulating the drilling fluid so treated in the well.

RAYMOND W. HOEPPEL.